United States Patent
Domani et al.

(10) Patent No.: US 11,028,867 B2
(45) Date of Patent: Jun. 8, 2021

(54) METHOD FOR MANUFACTURING AN EXPANSION ANCHOR BY REDUCING THE DIAMETER OF A SLEEVE BLANK, AND EXPANSION ANCHOR

(71) Applicant: Hilti Aktiengesellschaft, Schaan (LI)

(72) Inventors: Guenter Domani, Weissenberg (DE); Hideki Shimahara, Buchs (CH); Karl Haeussler, Lunden (CH)

(73) Assignee: Hilti Aktiengesellschaft, Schaan (LI)

( * ) Notice: Subject to any disclaimer, the term of this patent is extended or adjusted under 35 U.S.C. 154(b) by 50 days.

(21) Appl. No.: 16/076,609

(22) PCT Filed: Feb. 21, 2017

(86) PCT No.: PCT/EP2017/053847
§ 371 (c)(1),
(2) Date: Aug. 8, 2018

(87) PCT Pub. No.: WO2017/148731
PCT Pub. Date: Sep. 8, 2017

(65) Prior Publication Data
US 2019/0040894 A1 Feb. 7, 2019

(30) Foreign Application Priority Data
Mar. 1, 2016 (EP) .................................... 16157975

(51) Int. Cl.
*F16B 13/06* (2006.01)
*B21D 53/00* (2006.01)

(52) U.S. Cl.
CPC ............ *F16B 13/065* (2013.01); *B21D 53/00* (2013.01)

(58) Field of Classification Search
CPC ....... F16B 13/065; B21D 53/00; B21D 41/00; Y10T 29/49927; Y10T 29/49925; Y10T 29/44917; Y10T 29/49918
See application file for complete search history.

(56) References Cited

U.S. PATENT DOCUMENTS 1,858,920 A * 5/1932 Dunn ..................... B21B 19/04
72/97
3,745,803 A * 7/1973 Livelsberger ......... B21C 23/035
72/265

(Continued)

FOREIGN PATENT DOCUMENTS

DE 3120809 12/1982
EP 0 627 567 A1 12/1994
(Continued)

*Primary Examiner* — Lawrence Averick
(74) *Attorney, Agent, or Firm* — Davidson, Davidson & Kappel, LLC (57) ABSTRACT

A method for manufacturing an expansion anchor is provided, in which a bolt is provided, which includes an expansion body for expanding an expansion sleeve surrounding the bolt, an annular sleeve blank having an opening is provided, the bolt is introduced into the opening of the annular sleeve blank, and the annular sleeve blank is reduced in diameter while the bolt is located in the opening of the annular sleeve blank. The invention also relates to expansion anchors, which may be obtained with the aid of the method according to the invention, in particular bolt-type anchors having closed annular expansion sleeves and, in particular, anchors having expansion sleeves with protruding noses, which are each situated on a closing fold of the expansion sleeve.

21 Claims, 5 Drawing Sheets

(56) References Cited

U.S. PATENT DOCUMENTS

| | | | |
|---|---|---|---|
| 4,334,813 A | 6/1982 | Oettl | |
| 4,474,516 A * | 10/1984 | Schiefer | F16B 13/065 |
| | | | 411/44 |
| 4,896,521 A * | 1/1990 | Sbrana | B21C 23/205 |
| | | | 72/255 |
| 9,765,804 B2 | 9/2017 | Schaeffler | |
| 2006/0123630 A1 * | 6/2006 | Matsuura | F16C 33/1065 |
| | | | 29/898.057 |
| 2016/0238052 A1 * | 8/2016 | Schaeffer | F16B 13/065 |

FOREIGN PATENT DOCUMENTS

| | | |
|---|---|---|
| EP | 1 561 523 A1 | 8/2005 |
| EP | 2 848 825 A1 | 3/2015 |
| JP | S51142704 U1 | 11/1976 |

* cited by examiner

METHOD FOR MANUFACTURING AN EXPANSION ANCHOR BY REDUCING THE DIAMETER OF A SLEEVE BLANK, AND EXPANSION ANCHOR

The present invention relates to a method for manufacturing an expansion anchor as well as an expansion anchor.

BACKGROUND

Expansion sleeves for expansion anchors are frequently manufactured from sheet metal sections, which are first stamped and possibly embossed and then bent around the bolt. A corresponding method is described, for example, in EP 1 561 523 A1.

U.S. Pat. No. 4,334,813 A teaches to first manufacture two half shells by stamping and bending, which are then connected to each other at the bolt by forming the expansion sleeve.

EP 0 627 567 A1 describes a method for manufacturing an expansion sleeve, in which a blank is provided in a first step, which has a cylindrical collar and multiple segments, which protrude radially to the outside from the collar. In a subsequent step, the segments are bent inwardly into a position in which they surround the axis of the collar in a cylindrically segmented manner.

JP 51142704 U1 describes a manufacturing method for an anchor, in which a conical element having annular grooves and a sleeve-shaped element are provided. The sleeve-shaped element is then deformed by rolling in such a way that it engages with the annular grooves of the conical element.

EP 2 848 825 A1 shows an expansion anchor, in which the bolt has an outer contour with a large number of grooves in the neck area, which extend along the bolt, and in which the expansion sleeve has an inner counter with a large number of webs on its inside, which engage with the grooves to form a toothing, and due to which the wall thickness of the expansion sleeve is locally increased. An expansion reserve may be created hereby, which permits a particularly great expansion without having to significantly weaken the bolt in the neck area.

SUMMARY OF THE INVENTION

It is an object of the present invention to provide a method for manufacturing an expansion anchor as well as an expansion anchor, in particular manufactured in this method, in which a particularly high performance, reliability, and application diversity are ensured with a particularly high economic feasibility.

The present invention provides a manufacturing method and an expansion anchor. Preferred specific embodiments are provided in the particular dependent claims. Features which are explained in connection with the method according to the present invention may also be used in the expansion anchors according to the present invention, and conversely features which are explained in connection with the expansion anchors according to the present invention may also be used in the method according to the present invention.

In a method according to the present invention for manufacturing an expansion anchor, it is provided that a bolt is provided, which includes an expansion body for expanding an expansion sleeve surrounding the bolt;

an annular sleeve blank having an opening is provided;

the bolt, in particular the bolt including the expansion body, is introduced into the opening of the annular sleeve blank; and the annular sleeve blank is reduced in diameter while the bolt, in particular the bolt including the expansion body, is located in the opening of the annular sleeve blank.

Within the scope of the present invention, it has been observed that expansion sleeves which are manufactured by bending a sheet metal section around a bolt frequently have outer cross sections which deviate from a precisely circular shape. This may be attributed, among other things, to the fact that the sheet metal sections often would have to be overbent several degrees beyond the circular shape, due to their elasticity and the resulting resilience at the end of the bending process, to obtain a circular shape, and that an adequate overbending, however, is regularly not possible due to the inner bolt. However, the outer cross sections deviating from a circular shape may result in the fact that a comparatively large number of hammer blows are necessary to drive the sleeve into a drilled hole during installation of the anchor. If a sleeve having inner profiling is needed, for example for the anchor in EP 2 848 825 A1, the profiled sheet metal section to be bent may behave inhomogeneously during the bending process, due to the variable stiffness caused by the profiling, which may result in even greater shape deviations. In particular, this may, in certain circumstances, result in the fact that the inner profile of the expansion sleeve only inadequately corresponds to the outer profile of the bolt. Among other things, this may increase the friction between the bolt and the expansion sleeve during installation of the anchor and reduce the performance of the anchor.

This is where the present invention begins and provides for an alternative manufacturing method. In particular, a tubular sleeve blank is used according to the present invention, which has such a large outer diameter that it may be pushed onto the bolt, preferably past the expansion body. After the sleeve blank has been situated on the bolt in this manner, the sleeve blank is then reduced in diameter and formed into the finished expansion sleeve, in particular by plastic deformation of the sleeve blank. Accordingly, the sleeve blank is reduced in diameter after the bolt has been introduced into the opening of the annular sleeve blank.

Due to a method execution of this type, very round and thus reliably operating expansion sleeves may be obtained in particular because it is possible to easily work with closed, annular sleeve blanks, in which no essential shape deviations occur due to resilience, in contrast to bending a sheet metal section. In addition, since the annular sleeve blanks used may be comparatively easily manufactured from a wire, it is possible, according to the present invention, to use wire as the source material for manufacturing the sleeve, which is frequently more cost-effective than strip material. The method according to the present invention may also be advantageous, in particular in anchors in which the expansion sleeve has an inner profile which corresponds to an outer profile on the bolt, and which is meshed with the outer profile on the bolt, since the method according to the present invention makes it possible, on the one hand, to position the expansion sleeve particularly accurately relative to the bolt, and, on the other hand, according to the present invention the deformation of the sleeve blank, and thus its inner contour, is particularly uniformly and effectively reproducible during the mounting of the sleeve blank onto the bolt, so that undesirable maladjustments between the two corresponding profiles are particularly reliably avoidable. Moreover, expansion anchors having closed expansion sleeves may be particularly easily obtained with the aid of the method according to the present invention, in contrast to a bending method, namely by working with a closed, annular sleeve blank. Particularly stiff expansion sleeves may be obtained hereby, which may be advantageous with regard to the extraction behavior. Moreover, slitless expansion sleeves, or expansion sleeves having a particularly small slit width, may be manufactured, with the aid of which the expansion force may be essentially transmitted to the concrete along the entire sleeve circumference. Among other things, the extraction force may be increased hereby in a load range close to concrete failure.

Due to the manufacturing method according to the present invention, particularly advantageous anchor shapes may therefore be implemented, which are not accessible in other manufacturing methods or only with great complexity.

According to the present invention, the sleeve blank has an annular design. In particular, it forms a ring which surrounds the opening of the sleeve blank. During the course of the method according to the present invention, the bolt is introduced into the opening of the annular sleeve blank. As a result of this method step, the sleeve blank surrounds the bolt in an annular manner.

The diameter reduction may preferably take place at least in the outer diameter of the sleeve blank, in particular in both the inner diameter of the sleeve blank and the outer diameter of the sleeve blank. The diameter reduction takes place in at least one angular position of the sleeve blank, preferably in multiple angular positions of the sleeve blank, in particular essentially over the entire circumference of the sleeve blank. The diameter reduction may also involve a local enlargement of the diameter, for example by forming one or multiple bucklings, as is described in greater detail farther below.

According to the present invention, the expansion sleeve is manufactured from the sleeve blank. The expansion sleeve surrounding the bolt is thus obtained from the sleeve blank. In a first variant, the finished expansion sleeve may be obtained directly from the diameter reduction step. In a second variant, one or multiple final processing steps of the sleeve blank may follow the diameter reduction until the finished expansion sleeve is obtained therefrom. The expansion sleeve of the expansion anchor is thus obtained from the diameter-reduced sleeve blank, directly or optionally after additional manufacturing steps.

The sleeve blank may be, in particular, a tube piece. The sleeve blank and/or the expansion sleeve may preferably be elongated, i.e. the extension in the axial direction may be greater than the cross sectional extension. The bolt may be introduced into the sleeve blank by pushing the sleeve blank onto the stationary bolt, by inserting the bolt into the stationary sleeve blank or by a combined movement, in which both the sleeve blank and the bolt are moved.

The expansion body may completely surround the bolt. The cross section of the bolt may expand preferably continuously and/or preferably toward the front on the expansion body. The expansion body may be, in particular, an expansion cone. The expansion body may preferably be at least axially fixedly, particularly fixedly, situated on the bolt. In particular, the expansion body may be designed to form a single piece with the bolt.

To the extent that "radial," "axial" and "circumferential direction" are mentioned, this may apply, in particular, to the longitudinal axis of the bolt, the sleeve blank and/or the expansion sleeve, which may preferably be the axis of symmetry and/or the center axis of the bolt, the sleeve blank or the expansion sleeve.

The expansion body and/or the bolt preferably include a metal material, which may also be coated.

According to the present invention, a wedge gear may be formed between the expansion body and the expansion sleeve, which converts an axial relative movement between the expansion body and the expansion sleeve into a radial movement component of the expansion sleeve. The expansion sleeve may thus be forced radially outwardly by the expansion body and pressed against the drilled hole wall in the substrate when the expansion body is displaced axially relative to the expansion sleeve in the extraction direction, in particular together with the bolt. The expansion anchor, in turn, may be anchored in the drilled hole hereby. The expansion body may thus be used to radially press the expansion sleeve against a wall of a drilled hole and/or form a covering zone for the expansion sleeve. The extraction direction preferably runs in parallel to the longitudinal axis of the bolt and/or points out of the drilled hole. On the expansion body, the distance of the bolt surface from the longitudinal axis of the bolt may increase, at least in areas, against the extraction direction, i.e. it may increase as the distance from the load receiving device increases.

The expansion anchor may preferably be an expansion anchor which expands in a force-controlled manner, in particular a so-called bolt-type anchor. In a bolt-type anchor, the expansion body may be at least axially fixedly situated on the bolt. In this case, when installing the expansion anchor, the expansion body is pressed against the expansion sleeve by a shared axial movement of the bolt and the expansion body relative to the expansion sleeve. The expansion body preferably forms a single piece with the bolt.

It is particularly preferred that the sleeve blank is reduced in diameter by the application of radial forces onto the sleeve blank. Accordingly, the sleeve blank is preferably pressed onto the bolt. A particularly easy method execution may be achieved hereby.

In particular, the sleeve blank may be reduced in diameter by pressing, preferably radially pressing, at least one jaw against the sleeve blank. This may further simplify the method execution. In addition, if a jaw is used simultaneously with the diameter reduction, a structure may also be introduced into the outside of the sleeve blank. The at least one jaw is preferably moved in the radial direction in the method according to the present invention.

It is particularly preferred that the sleeve blank is reduced in diameter by simultaneously pressing, preferably radially pressing, multiple jaws against the sleeve blank. In particular, all jaws acting upon the sleeve blank during the diameter reduction may be simultaneously moved radially, whereby expansion sleeves having a particularly good roundness may be obtained.

It may be alternatively or additionally provided that the sleeve blank is reduced in diameter by introducing the sleeve blank into a reducing die. The reducing die may be a tool having a tool opening, in particular a through-opening, which has a smaller cross section than the sleeve blank. During the axial introduction of the sleeve blank into the reducing die, the sleeve blank is thus radially compressed by the wall of the tool opening. The diameter reduction with the aid of the reducing die may be provided as an alternative to the diameter reduction with the aid of jaw pressing, but also as an additional method step.

In principle, the sleeve blank may have an open, annular shape. However, it is particularly preferred that the sleeve blank forms a closed ring which surrounds the opening. In particular, the sleeve blank may thus have a topological genus of at least 1. Accordingly, in the method according to the present invention, the bolt is introduced into the closed ring of the sleeve blank. As is already explained above, particularly slight shape deviations may be achieved with closed sleeve blanks, since an undesirable resilience at open ends does not occur. In addition, expansion anchors which include closed expansion sleeves may be particularly easily obtained. Since expansion sleeves of this type are consistently stiffer than bent sleeves having an open slit, the extraction behavior of the expansion anchor may be improved hereby. Moreover, since the expansion force may be particularly uniformly distributed on the circumference of the expansion sleeve with the aid of closed expansion sleeves, particularly high extraction forces, in particular close to concrete failure, may be achieved. Finally, a closed expansion sleeve makes it possible to particularly easily apply a coating, for example a friction-increasing coating, to the lateral surface of the sleeve, for example by pad printing, without running the risk of the coating unintentionally getting between the expansion sleeve and the bolt.

It is particularly advantageous that, during the introduction of the bolt into the opening of the sleeve blank, the expansion body is pushed through the sleeve blank, at least in areas. During the introduction of the bolt into the opening, the expansion body thus enters the sleeve blank and, at least in areas, preferably completely, emerges from the sleeve blank again at the opposite, front end of the sleeve blank. In particular, the bolt is introduced into the opening of the sleeve blank, leading with its expansion body and/or leading with its front end. Accordingly, the opening of the sleeve blank preferably has a larger cross section than the expansion body, at least at the time of the introduction of the bolt into the opening, so that the sleeve blank may be slipped over the expansion body. An introduction of the bolt into the expansion sleeve, leading with the bolt front side, may further simplify the method execution and, in particular, also speed it up, due to the consistently shorter distances.

Another preferred embodiment of the present invention is that the sleeve blank is reduced in diameter and is fixed axially on the bolt, at least on one side, while the bolt is located in the opening of the annular sleeve blank. It is particularly preferred that the sleeve blank is fixed axially on the bolt on one side of the expansion body. According to this specific embodiment, at least one one-sided, preferably front, axial bearing for the sleeve blank is formed on the bolt by the compression and diameter reduction of the sleeve blank. In particular, the cross section of the opening of the sleeve blank is reduced to the extent that, after the diameter reduction, the sleeve blank may no longer be removed from the bolt in the way in which it was previously mounted on the bolt. The cross section of the opening of the sleeve blank is preferably reduced to the extent that, after the diameter reduction, the expansion sleeve may no longer be pushed over the expansion body, i.e., in particular, the cross section of the opening of the sleeve blank is reduced during the diameter reduction to the extent that the cross section of the opening is from now on smaller than the cross section of the expansion body. A captive securing means for the expansion sleeve may be formed hereby in a particularly simple process engineering manner and with a particularly good performance of the expansion anchor.

It is also particularly advantageous that the bolt has an axial stop for the sleeve blank, and the bolt is introduced deep into the opening of the sleeve blank until the sleeve blank hits the axial stop, in particular prior to the diameter reduction. In particular, the opening of the sleeve blank may be designed to have a smaller cross section than the axial stop for this purpose. Due to the advantageous design, a particularly easy and reliable positioning of the sleeve blank may be implemented. The axial stop may be configured in such a way that, in the finished expansion anchor, it may be used as an entrainer for the expansion sleeve during the introduction of the expansion anchor into the drilled hole. The axial stop may be formed, in particular, on a collar, preferably an annular collar, which may be designed to form a single piece with the bolt.

Another preferred refinement of the present invention is that the provided sleeve blank has at least one local wall thickness reduction, preferably multiple local wall thickness reductions. This local wall thickness reduction may selectively tear open during the installation of the expansion anchor and the radial expansion of the finished expansion sleeve when sliding along the expansion body. As a result, expansion tabs of the expansion sleeve may be particularly easily defined with the aid of the local wall thickness reduction. The local wall thickness reduction may furthermore receive the excess material which arises during the diameter reduction of the sleeve blank and form a targeted material weakening and in particular a compression zone, at which the sleeve blank is preferably deformed during the diameter reduction. This deformation behavior during the diameter reduction may thus be selectively influenced. In particular, slightly deformed sleeve areas may be defined, which may be advantageous particularly if these sleeve areas have functionally relevant shapes, for example shapes which are to correspond to the bolt. Moreover, deformed sleeve areas which are formed on the wall thickness reduction in a targeted manner may be used as functional elements, for example form retaining noses, on the finished expansion sleeve, as is explained in further detail below, so that a particularly powerful expansion anchor may be particularly easily obtained. A remaining wall thickness of approximately 0.2 mm, for example, may exist on the wall thickness reduction. The provided sleeve blank advantageously has multiple local wall thickness reductions, whereby, among other things, an expansion sleeve having a particularly great roundness and good functionality may be particularly easily obtained.

In particular, the wall thickness reduction may extend in the axial direction, preferably in parallel to the longitudinal axis of the sleeve blank, which may be advantageous with regard to the distribution of forces in the finished expansion sleeve during operation of the expansion anchor.

It is particularly advantageous that the local wall thickness reduction is at least partially, preferably exclusively, formed by a groove in the sleeve blank, preferably by a groove facing the opening of the sleeve blank, i.e. by a groove on the inside of the sleeve. Accordingly, the material remaining on the wall thickness reduction is situated relatively near the outside of the sleeve blank. In particular, it may be particularly easily and reliably ensured hereby that the remaining material protrudes radially on the outside of the sleeve during the diameter reduction, where it may form particularly effective functional elements of the finished expansion sleeve. In particular, the wall thickness reduction may be formed exclusively by a groove facing the opening of the sleeve blank. This may further simplify the manufacture of the sleeve blank.

In particular, it may be provided that the groove is closed, at least in sections, during the diameter reduction of the sleeve blank. Accordingly, opposite edges of the groove, which were formerly situated a distance apart, may come into contact with each other. A closing fold is formed on the wall thickness reduction during the diameter reduction. This may be advantageous, among other things, with regard to the performance of the finished expansion sleeve and the precision of the manufacturing process.

As already indicated above, it may be preferably provided that the sleeve blank is buckled, in particular plastically and preferably outwardly, at the local wall thickness reduction during the diameter reduction of the sleeve blank. The sleeve blank is thus preferably plastically deformed at the wall thickness reduction during the diameter reduction of the sleeve blank and preferably folded toward the outside; in particular, the thin edge having the remaining wall thickness is pressed outwardly and folded down and/or bulged out locally, forming a wave crest. For example, a nose may be obtained hereby, which counteracts a slipping of the finished expansion sleeve in the drilled hole. In particular, a particularly functional expansion sleeve may be particularly easily obtained. The material of the sleeve blank may be additionally shaped during the buckling due to the action of the jaws. It may also be provided that the sleeve blank is buckled inwardly, in particular plastically, at the local wall thickness reduction during the diameter reduction, for example into a groove in the bolt. And outward buckling at a first local wall thickness reduction and an inward buckling at a second local wall thickness reduction may also be provided.

It is particularly preferable that the sleeve blank is reduced in diameter by simultaneously pressing multiple jaws against the sleeve blank, the jaws being situated in an offset manner while being pressed against the sleeve blank, in particular offset in the circumferential direction, for the purpose of reducing the wall thickness. This may further simplify the manufacture of functional elements on the expansion sleeve and/or reduce tool costs.

Another preferred embodiment of the present invention is that the sleeve blank is teethed with the bolt during the diameter reduction of the sleeve blank. Accordingly, the sleeve blank has a structured inner surface, and the bolt has a structured outer surface, an engagement between the corresponding structures being effectuated during the diameter reduction. The structures may be at least partially formed only during the diameter reduction of the sleeve blank. However, it is particularly preferred that at least one part of the toothed structures is present before the diameter reduction step. In particular, it may thus be provided that the sleeve blank has a structured inner contour before the diameter reduction step, which at least partially corresponds to a structured outer contour of the bolt deviating from a circular shape. Particularly powerful expansion anchors may be particularly easily obtained hereby, in particular those as described in EP 2 848 825 A1. The preferred toothed engagement may, in particular, involve the manufacture of a form-locked, rotatably fixed connection between the sleeve blank and the bolt during the diameter reduction of the sleeve blank. The aforementioned structures may be, for example, ridges or grooves, which may extend, in particular, in the axial direction.

According to another advantageous embodiment of the present invention, the opening in the annular sleeve blank may be a through-opening, i.e. an opening which is open on opposite sides. The deformation of the sleeve blank during the diameter reduction may be even more easily controlled hereby, and particularly round expansion sleeves may be particularly easily obtained. In principle, the opening in the annular sleeve blank may also be a blind hole, i.e. an opening which is open on only one side. In this case, an expansion sleeve having a cover may be obtained, the cover covering the front end face of the bolt. The cover may also be used for axially positioning the sleeve blank on the bolt, since it strikes the bolt on the front of the bolt when the sleeve is pushed thereupon.

The sleeve blank may be particularly easily and cost-effectively manufactured in an extrusion process. The inner contour of the sleeve blank, which slides along the bolt in the finished expansion anchor, may be particularly easily and precisely manufactured in an extrusion process of this type. It is particularly preferred that the provision of the sleeve blank includes the shaping of the sleeve blank into a cup, in particular in an extrusion process. The geometric precision of the sleeve blank may be particularly easily even further improved hereby. The aforementioned extrusion processes may be, in particular, reverse extrusion processes, i.e. processes in which the material flows backwards along the stamp.

In particular, the provided bolt may include a load receiving device for introducing tensile forces into the bolt. The load receiving device may be designed, in particular, as a male thread, but also, for example as a female thread or as a nail head. It is used to introduce tensile forces into the bolt, which are oriented in the extraction direction.

The expansion body is preferably situated in a front area of the bolt, and/or the possibly present load receiving device is situated in a rear area of the bolt.

The outer profile of the sleeve blank may be preferably rotationally symmetrical at the end of the process, i.e. in particular after the sleeve blank has been formed into the finished expansion sleeve. The sleeve blank and/or the expansion sleeve may have expansion slits, which emerge from the front end face of the sleeve blank or the expansion sleeve. These expansion slits may facilitate the radial expansion of the expansion sleeve through the expansion body. The expansion slits may be provided only upon installation of the expansion anchor or arise from multiple wall thickness reductions which tear open during installation.

The expansion anchor according to the present invention is preferably manufactured using a method according to the present invention. It is equipped with a bolt and an expansion sleeve, which surrounds the bolt, the bolt including a load receiving device in a rear area, in particular end area, for the purpose of introducing tensile forces into the bolt and an expansion body in a front area, in particular end area, for the purpose of expanding the expansion sleeve surrounding the bolt. The expansion body is provided, in particular, for forcing the expansion sleeve radially outwardly for the purpose of anchoring the expansion anchor when the expansion cone is displaced relative to the expansion sleeve in the extraction direction.

According to a first aspect of the expansion anchor according to the present invention, it is provided that the expansion sleeve forms a closed ring through which the bolt passes, the bolt having an axial stop for the expansion sleeve between the rear area and the front area. The expansion sleeve is situated, in particular, upstream from the axial stop, i.e. on the side of the axial stop facing the expansion body. According to this aspect of the present invention, a closed annular expansion sleeve is provided on a bolt-type expansion anchor, i.e. in particular on an expansion anchor which is provided with a short expansion sleeve, which does not extend backward out of the hole and is provided with an axial stop on its bolt, which forms an entrainer for the expansion sleeve for the purpose of introducing the expansion sleeve into the hole in the substrate. The method according to the present invention makes it possible to provide bolt type anchors with a closed annular expansion sleeve, even those in which the expansion sleeve is unable to be pushed on from the rear end of the bolt, due to the proper action of the axial stop. As already described above, closed annular expansion sleeves, i.e. expansion sleeves which form a torus at least in areas and which surround the bolt over the entire circumference without a slit, at least in areas, may be provided with a particularly stiff design, compared to a sleeve having an open slit, which may improve the extraction behavior of the expansion anchor. Moreover, the expansion force may be particularly uniformly distributed on the circumference of the expansion sleeve in closed annular expansion sleeves, which may result in particularly high extraction forces, in particular close to concrete failure. Finally, a closed expansion sleeve makes it possible to particularly reliably apply a coating to the outer lateral surface of the sleeve.

The axial stop is at least axially fixedly, preferably fixedly, situated on the bolt and forms a single piece with the bolt. The axial stop may be formed, for example, on an annular collar of the bolt. According to the present invention, the axial stop is situated, in particular, between the expansion body and the rear area of the bolt and limits a displacement of the expansion sleeve away from the expansion body toward the rear end of the bolt. The expansion body preferably forms another axial stop for the expansion sleeve, namely an axial stop which limits a displacement of the expansion sleeve toward the front end of the bolt. Both the axial stop and the expansion body thus each form a one-sided axial bearing for the expansion sleeve.

According to a second aspect of the expansion anchor according to the present invention, it is provided that the expansion sleeve has at least one nose protruding radially, in particular outwardly, on the expansion sleeve, which is situated on a closing fold of the expansion sleeve. This second aspect of the expansion anchor according to the present invention may be implemented additionally or alternatively to the aforementioned first aspect of the expansion anchor according to the present invention. The second aspect of the expansion anchor according to the present invention may also be implemented with regard to manufacturing in a method according to the present invention. In particular, according to the second aspect of the expansion anchor according to the present invention, the nose projecting radially on the expansion sleeve may be formed by a buckling on a wall thickness reduction of the expansion sleeve, the buckling being formed during the diameter reduction of the sleeve blank forming the expansion sleeve. Accordingly, the nose may thus be formed radially outside a closing fold on a local wall thickness reduction of the expansion sleeve. In particular, the nose designed in this manner may perform a dual function: on the one hand, it may effectuate an anchoring together with the drilled hole wall of the surrounding substrate, due to its local protrusion. On the other hand, it may define a predetermined breaking point, due to its arrangement according to the present invention on a closing fold, at which the expansion sleeve preferably tears open when the expansion sleeve is pushed onto the expansion body, expansion tabs preferably being formed. In particular, the expansion sleeve may be completely closed prior to the expansion operation, which may involve, in particular, the fact that no separate expansion tabs are present prior to tightening the nut. However, the closed annular expansion sleeve may also have expansion tabs prior to the expansion operation, to the extent that the expansion tabs do not interrupt the closed annular shape.

The arrangement of the nose of the expansion sleeve on a local wall thickness reduction of the expansion sleeve may be seen as another independent aspect of the expansion anchor according to the present invention.

It is particularly preferable that the expansion sleeve and the bolt are teethed with each other in the cross section of the bolt. Accordingly, the expansion sleeve and the bolt thus each have cross sections deviating from a circular shape, which engage with each other in the cross section of the expansion anchor. For example, toothings as described in EP 2 848 825 A1 may be provided.

The present invention is explained in greater detail below on the basis of preferred exemplary embodiments, which are represented schematically in the attached figures, it being possible, in principle, to implement individual features of the exemplary embodiments illustrated below individually or in any combination within the scope of the present invention.

DETAILED DESCRIPTION

FIGS. 1 through 9 show consecutive process stages in the manufacture of an expansion anchor according to the present invention in a manufacturing method according to the present invention. For the sake of clarity, the rear area of the bolt, including the load receiving device, is illustrated only in FIGS. 5 and 9, where it is also only interrupted.

Figure 1:
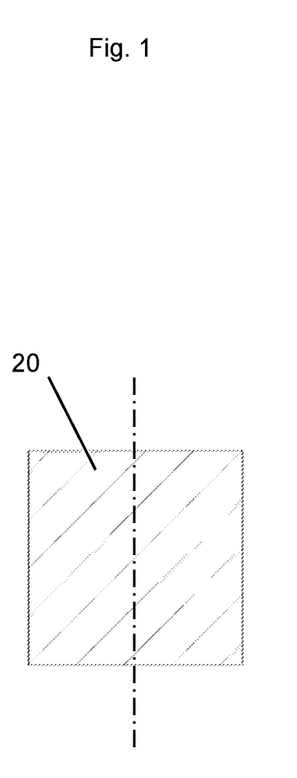
FIGS. 1, 2, 3, 4, 5, 6, 7, 8 and 9 schematically show simplified representations of the workpieces in consecutive process stages while carrying out a manufacturing method according to the present invention, in a longitudinal sectional view in FIGS. 1 through 4, and in a perspective view in FIGS. 5 through 9, with an expansion anchor according to the present invention as the end product in FIG. 9.

In a first process step, a short piece of an extended wire is cut to length, and a sleeve blank 20 designed as a wire piece is thus obtained, as illustrated in FIG. 1.

Figure 2:
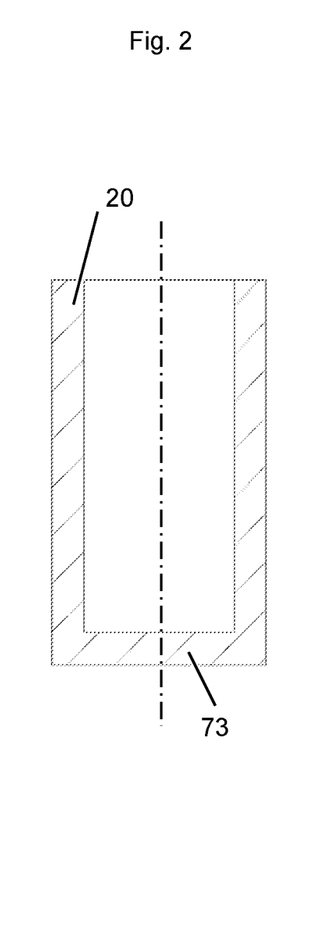

Sleeve blank 20 is then reshaped in an extrusion process, in particular in a reverse extrusion process, preferably a cup reverse extrusion process, to form the cup having a base 73 shown in FIG. 2. In this extrusion process, the inner contour of sleeve blank 20 shown, for example, in the cross-sectional view in FIG. 10, may be introduced into sleeve blank 20.

Figure 3:
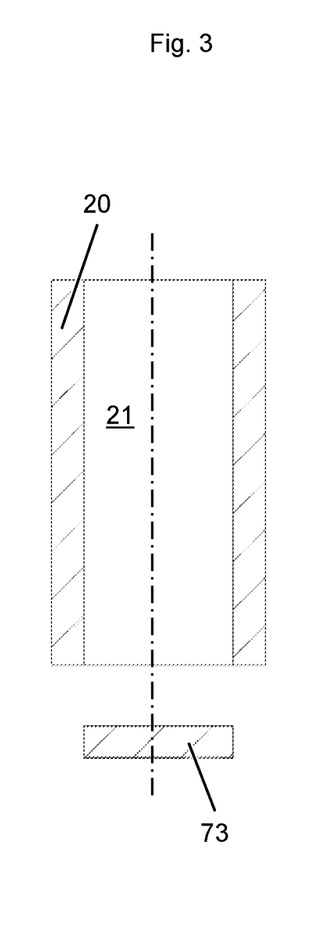

In a subsequent method step, which may be, for example, a stamping step, base 73 of sleeve blank 20 is removed, and a tubular workpiece is obtained, as illustrated in FIG. 3, which surrounds opening 21 designed as a through-opening in a closed, annular manner.

Figure 4:
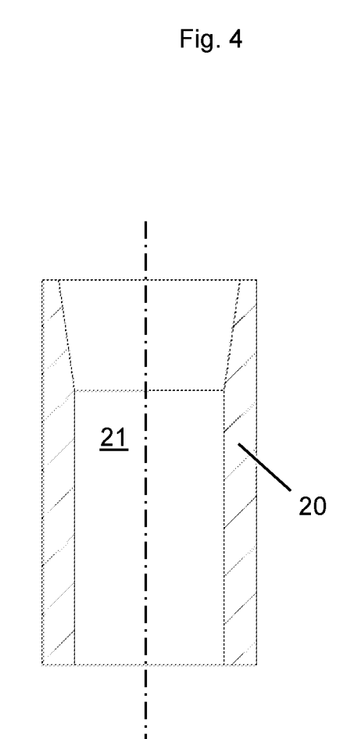

Sleeve blank 20 may be optionally still further structured, thus obtaining a shape illustrated in FIG. 4.

Figure 5:
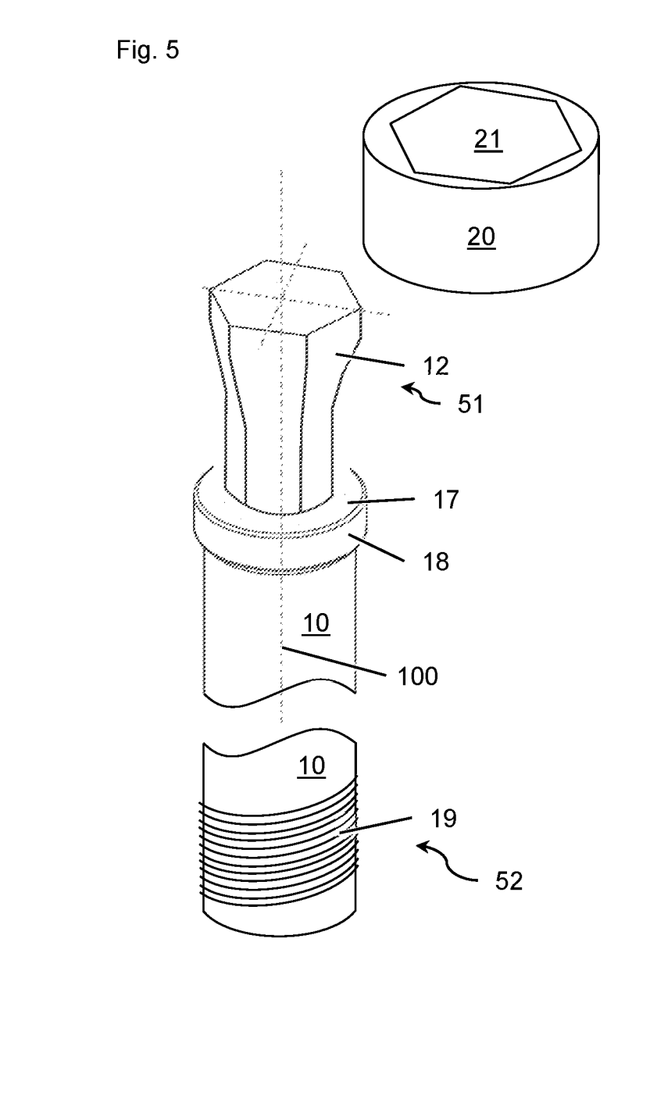

In the next method step, a bolt 10 is provided, as illustrated in FIG. 5. This bolt 10 includes a load receiving device 19, illustrated by way of example as a male thread, in its rear area 52 for the purpose of introducing tensile forces into bolt 10 and an expansion body 12, illustrated by way of example as an expansion cone having a polygonal cross section, in its front area 51, at which the bolt cross section expands toward the front for the purpose of radially expanding an expansion sleeve 30. Bolt 10 includes an axial stop 17, designed for example as an annular shoulder, for expansion sleeve 30 between expansion body 12 and load receiving device 19 and/or rear area 52. This axial stop 17 is preferably provided with a closed annular design and/or is formed on an annular collar 18 which forms, in particular, a single piece with bolt 10.

Opening 21 in sleeve blank 20 is dimensioned in such a way that, on the one hand, sleeve blank 20 may be slipped over expansion body 12 of bolt 10 while, on the other hand, being dimensioned in such a way that sleeve blank 20 is axially stopped by axial stop 17. For this purpose, opening 21 of sleeve blank 20 designed as a through opening preferably has a larger cross section than expansion body 12 but a smaller cross section than axial stop 17 and annular collar 18.

Figure 6:
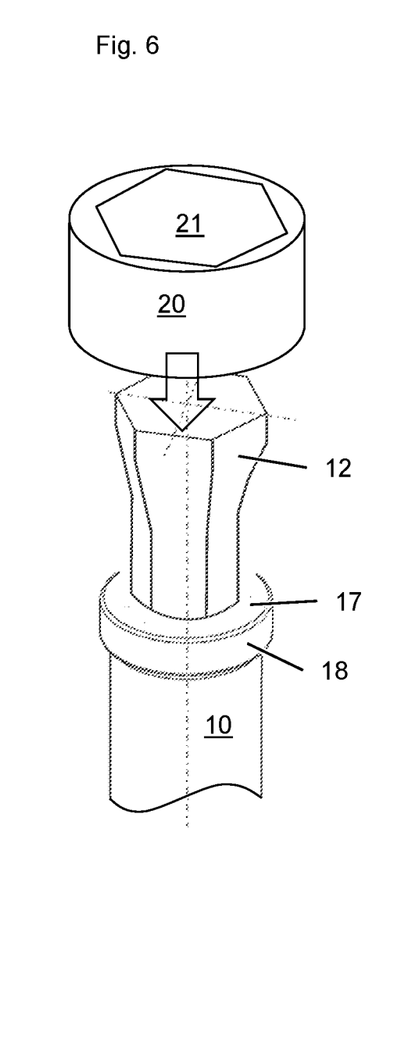
Figure 7:
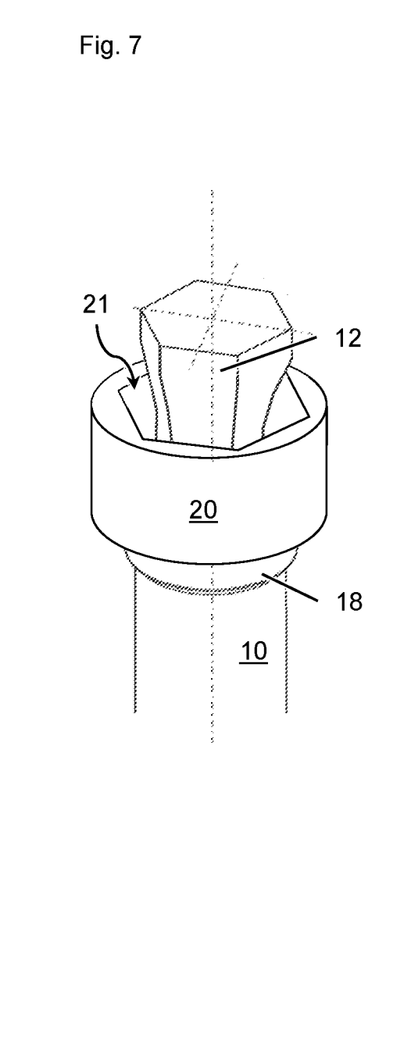

In the next step, sleeve blank 20 is pushed onto bolt 10 from the front end of bolt 10 at least partially over expansion body 12, as indicated by an arrow in FIG. 6, in particular until sleeve blank 20 strikes axial stop 17. Bolt 10 is inserted into opening 21 in expansion body 12 designed as a through-opening, until the front end of bolt 10 and preferably at least one part of expansion body 12 emerge again from sleeve blank 20, i.e. bolt 10 is inserted through sleeve blank 20. The resulting state is illustrated in FIG. 7. Pushing sleeve blank 20 onto bolt 10 may be effectuated by a movement of sleeve blank 20, a movement of bolt 10 or a combined movement of both sleeve blank 20 and bolt 10.

Figure 8:
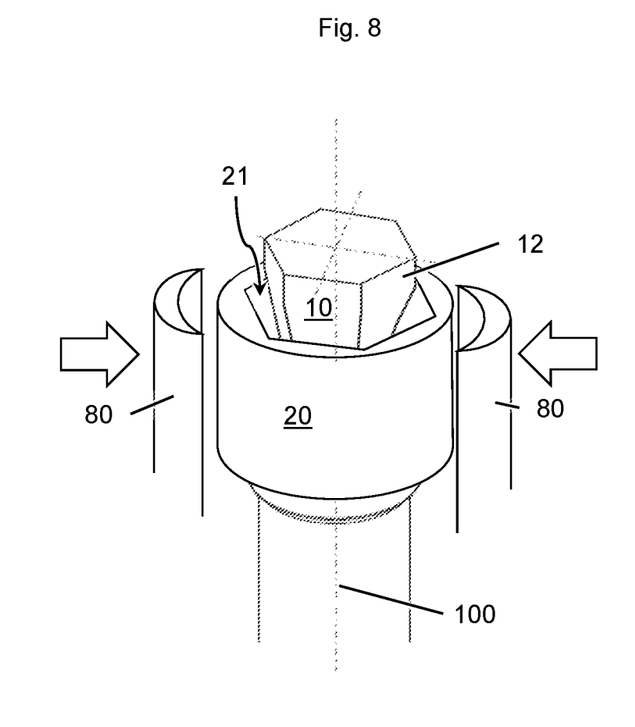
Figure 9:
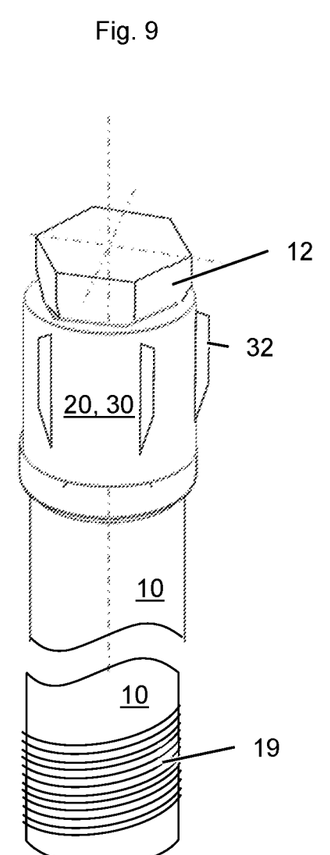
Figure 10:
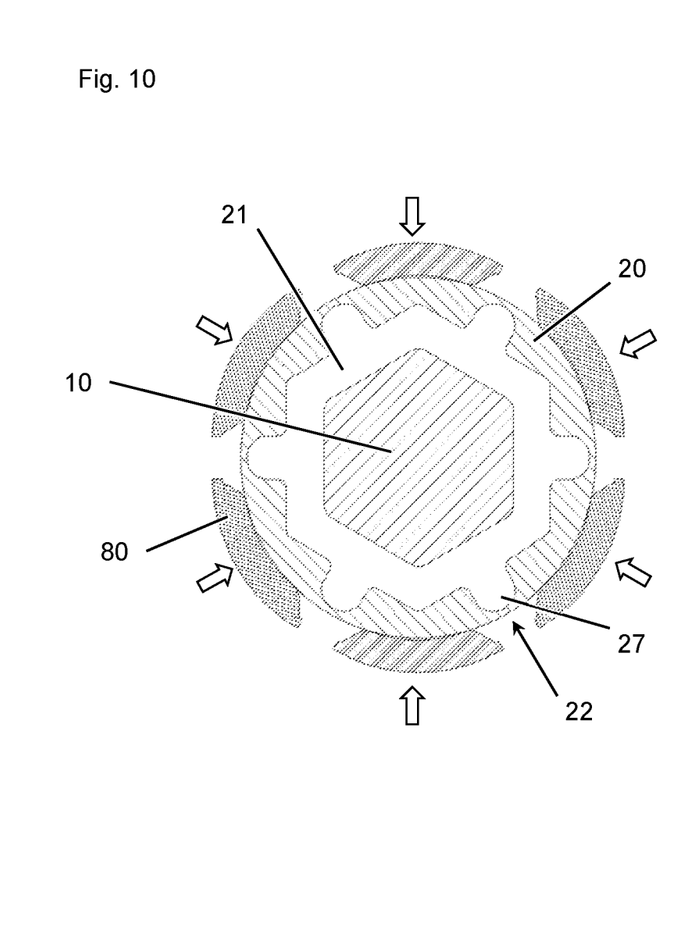
FIG. 10 schematically shows a cross-sectional view of the workpieces and the tools at the beginning of the process stage in FIG. 8.
Figure 11:
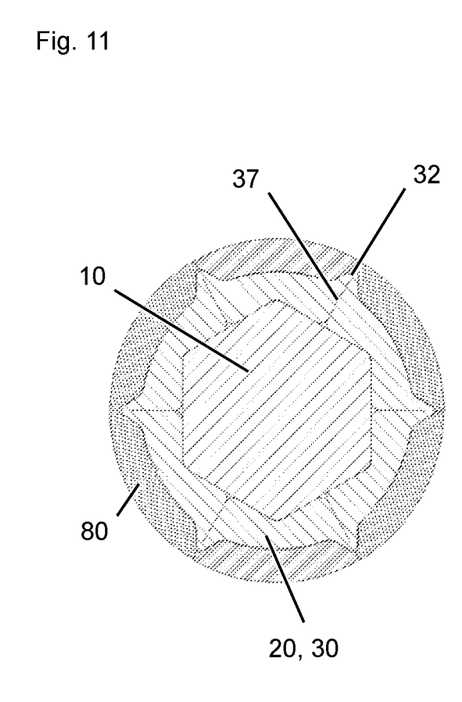
FIG. 11 schematically shows a cross-sectional view, similar to FIG. 10, of the workpieces and the tools at the end of the process stage in FIG. 8.
Figure 12:
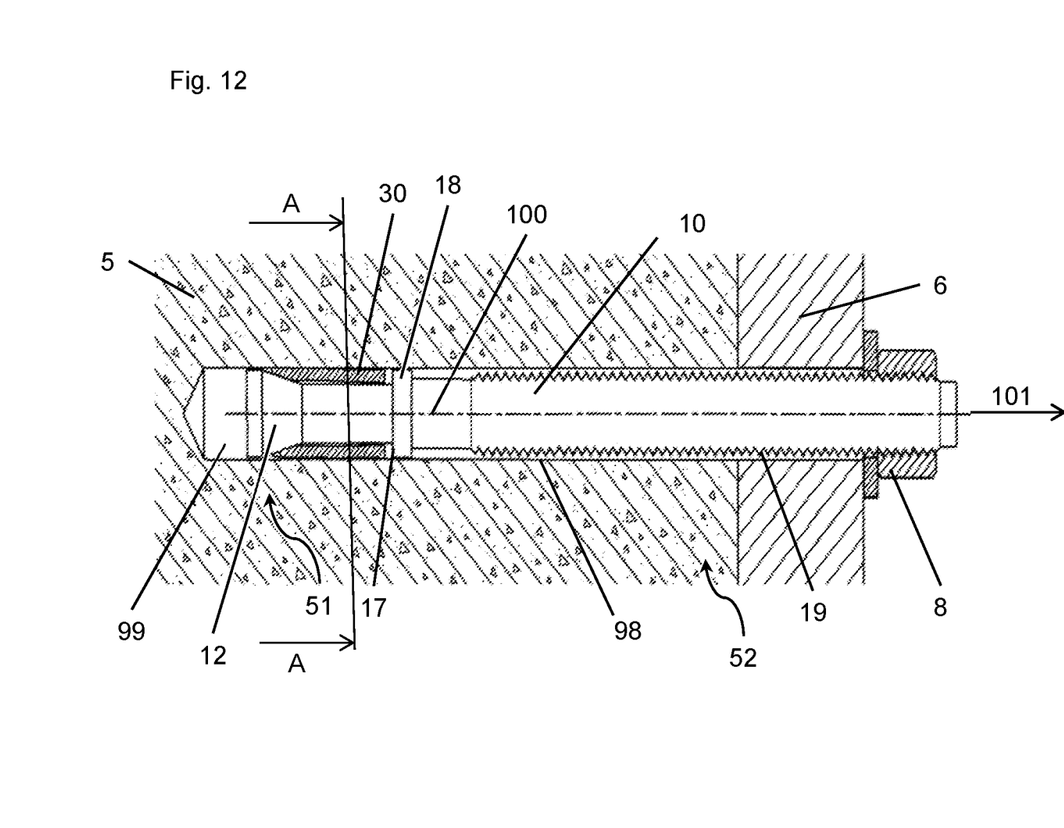
FIG. 12 schematically shows a longitudinal sectional view of an expansion anchor according to the present invention situated in a substrate.

Sleeve blank 20, together with inner bolt 10, is subsequently situated between jaws 80 of a reshaping device, as illustrated in FIGS. 8 and 10. As indicated by arrows in FIGS. 8 and 10, pressure is then applied to sleeve blank 20 by jaws 80 in the radial direction in each case, in particular with respect to longitudinal axis 100 of bolt 10, which is still situated inside sleeve blank 20. Due to the action of jaws 80, sleeve blank 20 is compressed in cross-sectional planes running perpendicularly to longitudinal axis 100 of bolt 10 (planes of this type are illustrated in FIGS. 10 and 11) and reduced in diameter, preferably to the extent that sleeve blank 20 may from now on no longer be removed from bolt 10 over expansion body 12, i.e. toward the front. As illustrated in FIGS. 9 and 11, expansion sleeve 30 is obtained from sleeve blank 20, possibly after optional finishing steps.

Figure 13:
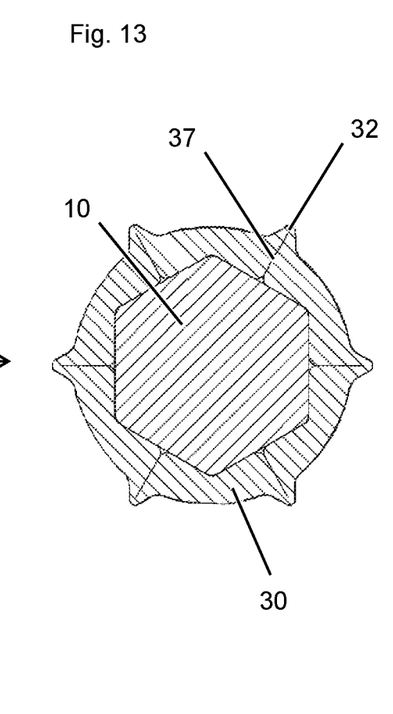
FIG. 13 schematically shows a cross-sectional view A-A of the anchor in FIG. 12.

As illustrated, in particular, in FIG. 10, sleeve blank 20 has an inner contour prior to being acted upon by jaws 80. This inner contour may be manufactured, in particular, in the aforementioned extrusion process. The inner contour of sleeve blank 20 represents a negative shape with respect to an outer contour of bolt 10, the latter preferably deviating from a circular shape. As a result, sleeve blank 20 and bolt 10 come into engagement with each other during the diameter reduction of sleeve blank 20 in such a way that finished expansion sleeve 30 and bolt 10 are teethed with each other in the cross section of bolt 10, as illustrated in FIGS. 11 and 13, i.e. they fit together, so to speak.

As is also illustrated, in particular, by FIG. 10, sleeve blank 20 furthermore has local wall thickness reductions 22 before being acted upon by jaws 80, six wall thickness reductions 22 in the present exemplary embodiment, at which the wall thickness of sleeve blank 20 is locally smaller than in the surrounding area. Wall thickness reductions 22 are preferably each formed by a groove 27 situated on the inside of sleeve blank 20, i.e. facing opening 21. As illustrated in FIG. 10, wall thickness reductions 22 and/or grooves 27 are each preferably situated in an offset manner with respect to jaws 80 in the circumferential direction, exemplary embodiments also being conceivable, in which at least one part of wall thickness reductions 22 and/or grooves 27 are radially covered by jaws 80.

As illustrated, in particular, by a comparison of FIGS. 10 and 11, wall thickness reductions 22 are used as compression zones, in which the material of sleeve blank 20 is compressed in a targeted manner in the circumferential direction during the diameter reduction. In particular, grooves 27 are closed during the diameter reduction, each forming a closing fold 37, the material of sleeve blank 20 still remaining at wall thickness reductions 22 and situated radially on the outside of grooves 27 being buckled radially outwardly, forming noses 32. In the sleeve cross section resulting herefrom, which is apparent, in particular in FIGS. 11 and 13 but also in FIG. 9, expansion sleeve 30 includes locally radially outwardly protruding noses 32, noses 32 each being located radially outwardly upstream from a closing fold 37 formed in expansion sleeve 30, and thus a material weakening of expansion sleeve 30.

FIGS. 9, 11, 12 and 13 show the expansion anchor according to the present invention obtained in the manufacturing method according to the present invention, FIG. 9 within the scope of the proper use of the expansion anchor. When the expansion anchor is properly installed, bolt 10 is pushed into a drilled hole 99 in substrate 5 from FIG. 9 in the direction of longitudinal axis 100 of bolt 10, leading with its front area 51 and expansion body 12. Due to axial stop 17, expansion sleeve 30 is also introduced into drilled hole 99. Bolt 10 is then pulled out of drilled hole 99 a bit farther in extraction direction 101, for example by tightening a nut 8 situated on load receiving device 19 designed as a male thread. Due to the friction with wall 98 of drilled hole 99, expansion sleeve 30 remains behind, and as a result a displacement of bolt 10 relative to expansion sleeve 30 occurs, within the scope of which the expanding expansion body 12 of bolt 10 acts radially against expansion sleeve 30 and presses it against wall 98 of drilled hole 99. Due to this mechanism, the expansion anchor is fixed in substrate 5. FIG. 9 shows the installed state of the expansion anchor, in which it is fixed in substrate 5. An attachment part 6 may be fixed on substrate 5 with the aid of nut 8.

Noses 32 protruding on expansion sleeve 30 may grip wall 98 of drilled hole 99 during the insertion of the expansion anchor into drilled hole 99 and thus form an anti-twist protection or an anti-tension protection for expansion sleeve 30.

Closing folds 37 of expansion sleeve 30, which are formed on former grooves 27 and wall thickness reductions 22 of sleeve blank 20, and which are preferably located radially beneath noses 32, may form predetermined breaking points, at which expansion sleeve 30 tears open during installation, preferably forming expansion tabs. Closed annular expansion sleeve 30 may have slits and expansion tabs already prior to installation. However, the expansion tabs are preferably at least partially formed only during installation, namely by the tearing open of expansion sleeve 30 at closing folds 37.

What is claimed is:

1. A method for manufacturing an expansion anchor, comprising:
   providing a bolt including an expansion body for expanding an expansion sleeve surrounding the bolt;
   providing an annular sleeve blank having an opening, the providing of the annular sleeve blank including shaping of the sleeve blank into a cup via an extrusion process;

introducing the bolt into the opening of the annular sleeve blank; and reducing the annular sleeve blank in diameter while the bolt is located in the opening of the annular sleeve blank wherein an inner contour of the sleeve blank deviating from a circular shape is manufactured during the extrusion process;

the sleeve blank being teethed with the bolt during the diameter reduction of the sleeve blank so as to conform an inner surface of the sleeve blank to a non-circular outer surface of the bolt.

2. The method as recited in claim 1 wherein the sleeve blank is reduced in diameter by the application of radial forces onto the sleeve blank.

3. The method as recited in claim 1 wherein the sleeve blank is reduced in diameter by pressing at least one jaw against the sleeve blank or the sleeve blank is reduced in diameter by introducing the sleeve blank into a reducing die.

4. The method as recited in claim 3 wherein the sleeve blank is reduced in diameter by simultaneously pressing multiple jaws of the at least one jaw against the sleeve blank.

5. The method as recited in claim 1 wherein the sleeve blank forms a closed ring surrounding the opening.

6. The method as recited in claim 1 wherein, during the introduction of the bolt into the opening of the sleeve blank, the expansion body is pushed through the sleeve blank, at least in areas.

7. The method as recited in claim 1 wherein the sleeve blank is reduced in diameter and is fixed axially on the bolt at least on one side while the bolt is located in the opening of the annular sleeve blank.

8. The method as recited in claim 7 wherein the sleeve blank is fixed axially on the expansion body.

9. The method as recited in claim 1 wherein the bolt has an axial stop for the sleeve blank, and the bolt is introduced into the opening of the sleeve blank until the sleeve blank strikes the axial stop.

10. The method as recited in claim 1 wherein the sleeve blank has at least one local wall thickness reduction.

11. The method as recited in claim 10 wherein a local wall thickness reduction is at least partially formed by a groove in the sleeve blank, the groove facing the opening of the sleeve blank.

12. The method as recited in claim 11 wherein the groove is closed, at least in sections, during the diameter reduction of the sleeve blank.

13. The method as recited in claim 10 wherein the sleeve blank is buckled at the local wall thickness reduction during the diameter reduction of the sleeve blank.

14. The method as recited in claim 10 wherein the sleeve blank is reduced in diameter by simultaneously pressing multiple jaws against the sleeve blank, the jaws being situated in a circumferentially offset manner with respect to the at least one wall thickness reduction while being pressed against the sleeve blank.

15. The method as recited in claim 1 wherein the opening in the annular sleeve blank is a through-opening.

16. The method as recited in claim 1 wherein the bolt includes a load receiver for introducing tensile forces into the bolt.

17. An expansion anchor manufactured according to the method as recited in claim 1 comprising:

a bolt; and an expansion sleeve surrounding the bolt;

the bolt including a load receiver in a rear area for introducing tensile forces into the bolt and an expansion body in a front area for expanding the expansion sleeve surrounding the bolt, wherein the expansion sleeve forms a closed ring, through which the bolt passing through the closed ring, the bolt having an axial stop for the expansion sleeve between the rear area and the front area, or the expansion sleeve having at least one radially protruding nose on the expansion sleeve and situated on a closing fold of the expansion sleeve.

18. The method as recited in claim 1 wherein the providing of the annular cup includes removal of a base of the cup.

19. A method for manufacturing an expansion anchor, comprising:

providing a bolt including an expansion body for expanding an expansion sleeve surrounding the bolt;

providing an annular sleeve blank having an opening;

introducing the bolt into the opening of the annular sleeve blank; and reducing the annular sleeve blank in diameter while the bolt is located in the opening of the annular sleeve blank;

the sleeve blank being teethed with the bolt during the diameter reduction of the sleeve blank so as to conform an inner surface of the sleeve blank to a non-circular outer surface of the bolt.

20. The method as recited in claim 19 wherein the sleeve blank being teethed with the bolt results in a rotatably fixed connection between the sleeve blank and the bolt.

21. A method for manufacturing an expansion anchor, comprising:

providing a bolt including an expansion body for expanding an expansion sleeve surrounding the bolt;

providing an annular sleeve blank having an opening;

introducing the bolt into the opening of the annular sleeve blank; and reducing the annular sleeve blank in diameter while the bolt is located in the opening of the annular sleeve blank;

the sleeve blank being reduced in diameter by simultaneously pressing multiple jaws against the sleeve blank, the jaws being situated in a circumferentially offset manner with respect to a wall thickness reduction while being pressed against the sleeve blank;

the sleeve blank being teethed with the bolt during the diameter reduction of the sleeve blank so as to conform an inner surface of the sleeve blank to a non-circular outer surface of the bolt.

* * * * *